G. G. PORTER & F. E. CABLE.
LATHE.
APPLICATION FILED MAR. 22, 1915.

1,196,024.

Patented Aug. 29, 1916.
4 SHEETS—SHEET 1.

Inventors
George G. Porter
Frank E. Cable,

G. G. PORTER & F. E. CABLE.
LATHE.
APPLICATION FILED MAR. 22, 1915.

1,196,024.

Patented Aug. 29, 1916.
4 SHEETS—SHEET 3.

Witness
C. H. Kaeder

Inventors
George G. Porter
Frank E. Cable,
By Dodge and Sons, Attorneys

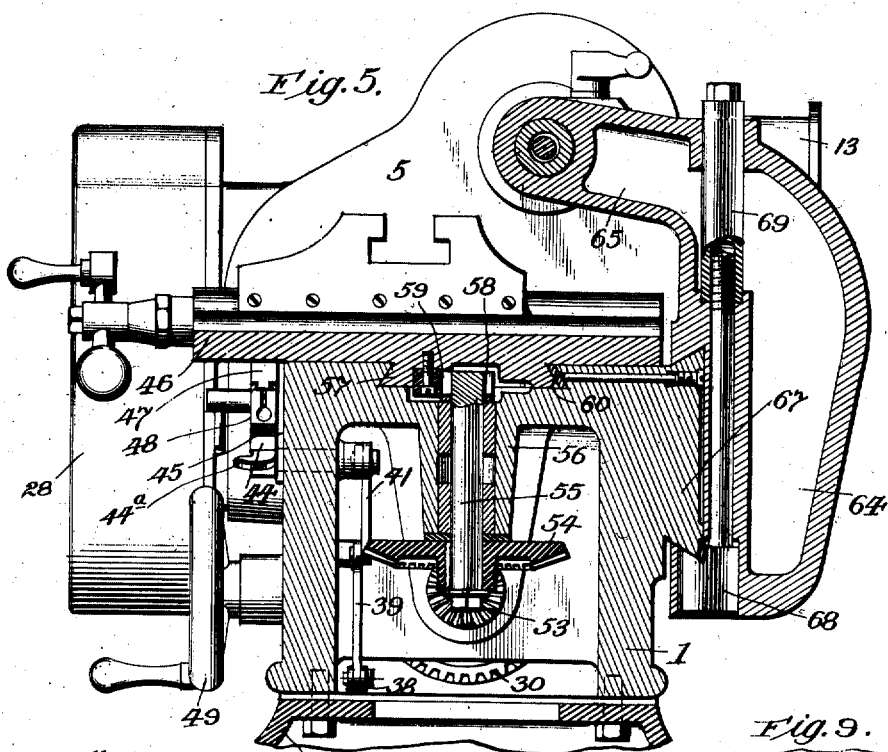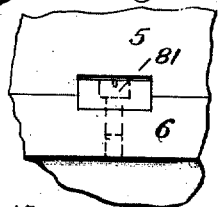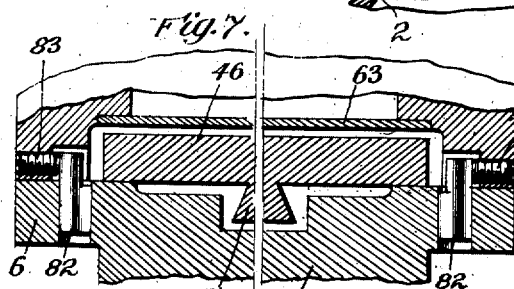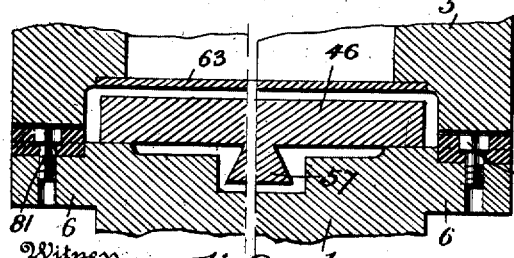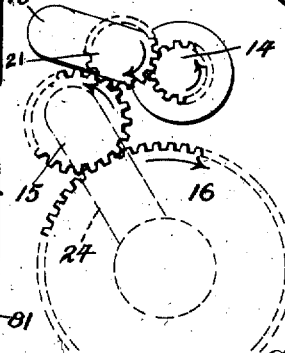

UNITED STATES PATENT OFFICE.

GEORGE G. PORTER AND FRANK E. CABLE, OF SYRACUSE, NEW YORK, ASSIGNORS TO THE PORTER-CABLE MACHINE COMPANY, OF SYRACUSE, NEW YORK, A CORPORATION OF NEW YORK.

LATHE.

1,196,024.     Specification of Letters Patent.     Patented Aug. 29, 1916.

Application filed March 22, 1915. Serial No. 16,226.

*To all whom it may concern:*

Be it known that we, GEORGE G. PORTER and FRANK E. CABLE, citizens of the United States, residing at Syracuse, in the county of Onondaga and State of New York, have invented certain new and useful Improvements in Lathes, of which the following is a specification.

Figure 1:
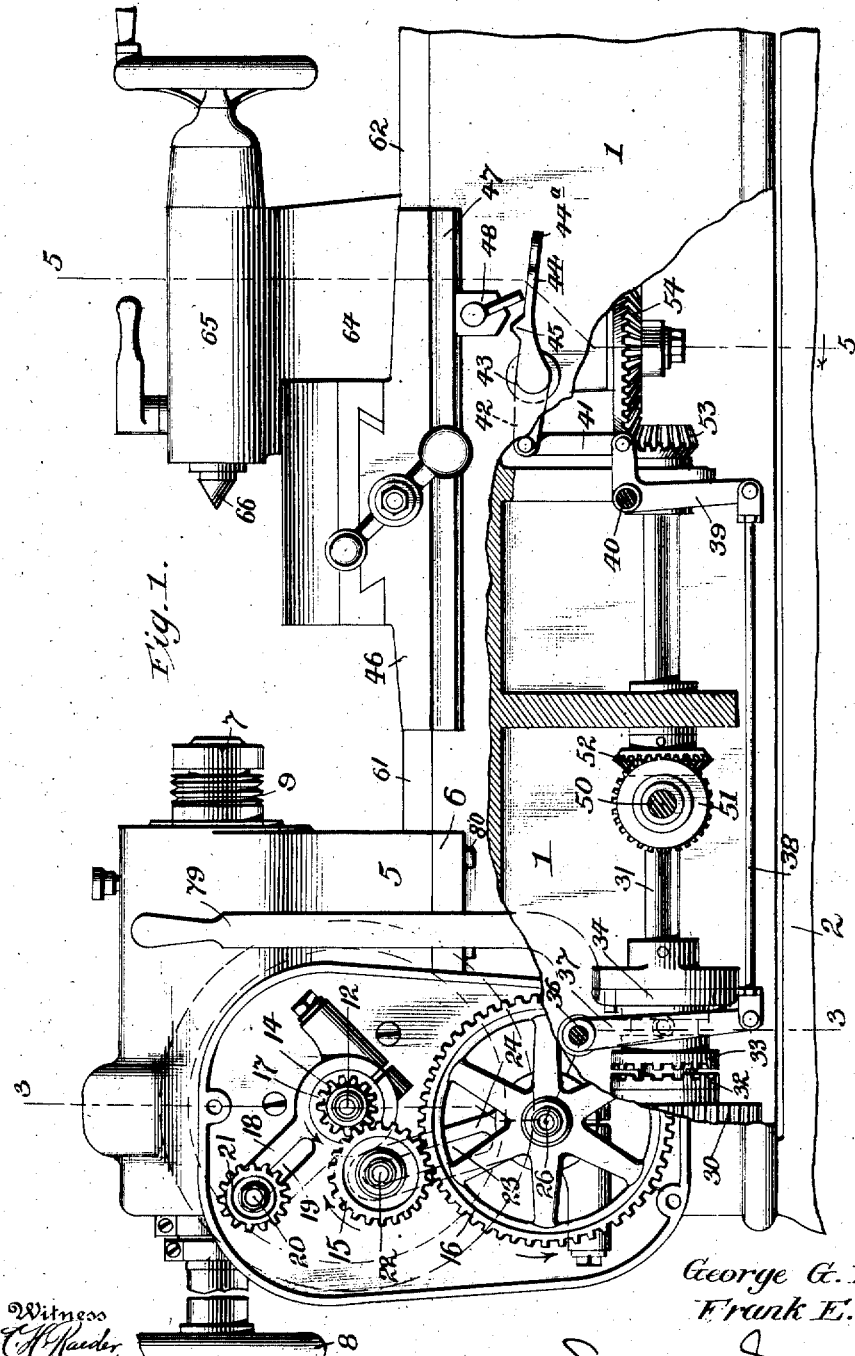
Figure 2:
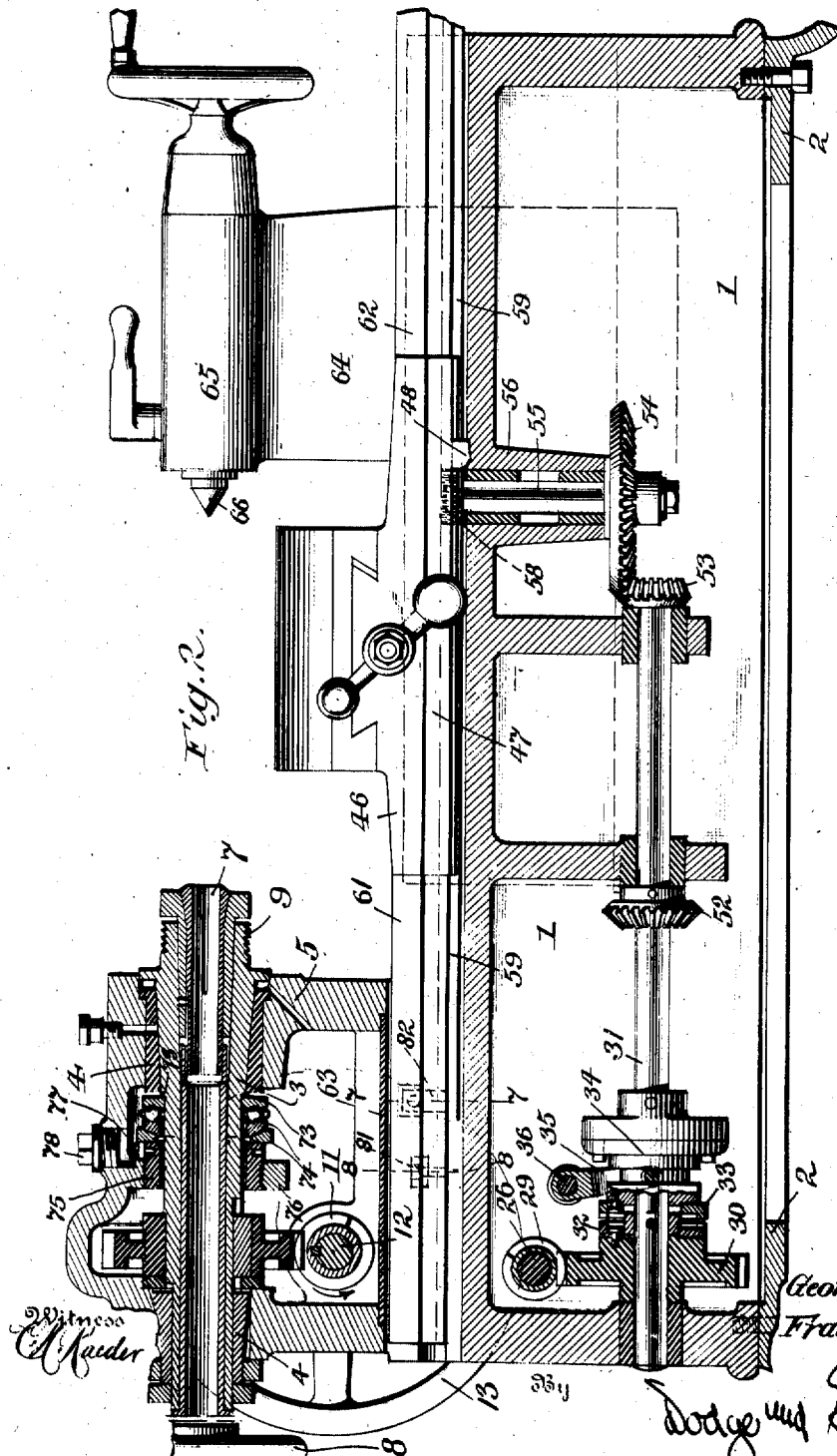
Figure 3:
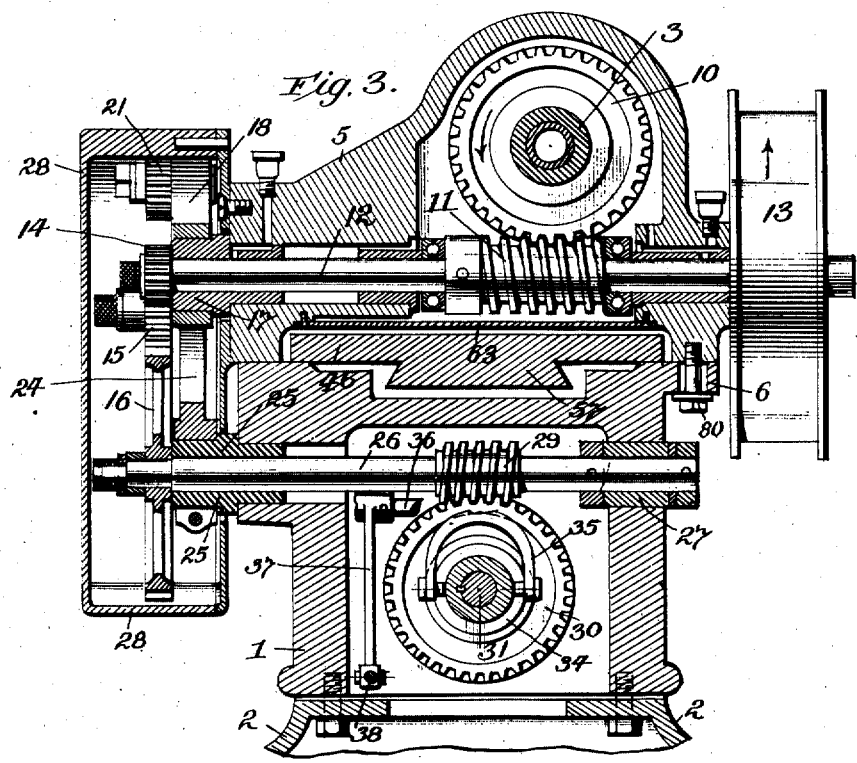
Figure 4:
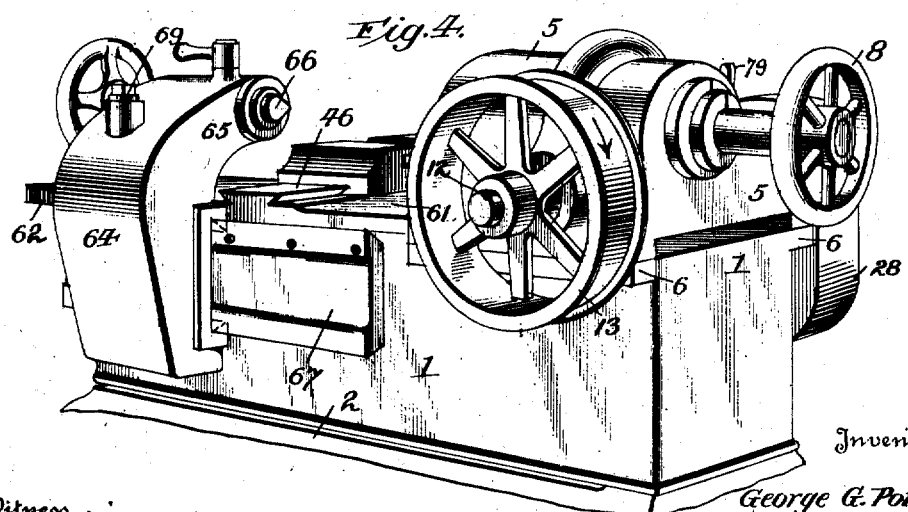

This invention pertains to an improvement in lathes, the construction and advantages of which will be hereinafter set forth, reference being had to the annexed drawings, wherein:

Figure 1 is a front elevation of the lathe, a portion of the frame being broken away to more clearly illustrate certain features of construction; Fig. 2 a longitudinal vertical sectional view, the tool slide and tail-stock being shown in full lines; Fig. 3 a transverse vertical sectional view, taken on the line 3—3 of Fig. 1; Fig. 4 a perspective view of the lathe as viewed from the rear and illustrating more particularly the manner of mounting the tail-stock upon ways or guides formed upon the side of the body or frame; Fig. 5 a transverse vertical sectional view, taken on the line 5—5 of Fig. 1; Fig. 6 a diagrammatic view showing the gearing in a different adjusted position; Fig. 7 a transverse sectional view, on the line 7—7 of Fig. 2; Fig. 8 a similar view on the line 8—8 of Fig. 2, and Fig. 9 a detail side elevation of one of the keys and allied parts, shown in Fig. 8.

The main object of our invention is to provide a simple and compact lathe, which while being compact and relatively small is very rigid, and for such size work as is within its capacity for length and diameter, is very efficient and capable of taking as heavy cuts and feeds as are taken on regular lathes many times its size and weight and costing more. It is a well-known fact that a very large part of the lathe-work which is done on a manufacturing basis consists of short pieces of small diameter, as, for instance, drills, reamers, end-mills, taps, studs, bolts, bushings, pinions and countless other things which are turned on arbors or between centers, also a variety of work which is held in the chuck, on the face-plate, or on special fixtures fastened to the nose of the spindle. It is also well-known that heretofore the universal practice has been to produce all of these pieces on a regular engine lathe having a length of bed, or capacity between centers, many times that required. Such operations are usually continuous week in and week out, and the resulting loss occasioned by unnecessary investment in unused machinery, and floor space occupied by useless equipment, is considerable. Furthermore, where long beds are employed and the tool-carriage is constantly moved back and forth over a short space only, there is, of necessity, a wear in the parts at such point which tends to throw the carriage out of proper alinement with the head and tail stocks. The lathe herein shown is designed to correct the conditions just referred to. The small size and great rigidity of this lathe is made possible by the novel arrangement of the head-stock and its related parts, and the improved overhanging tail-stock mounted at the rear of the bed, which permits of the free operation of the carriage underneath it, thereby allowing the carriage to be made unusually wide, and as it is not bridged over the ways, as in the ordinary lathe, but has a bearing underneath it throughout almost its entire area, it is exceptionally rigid, as will be hereinafter more fully described.

Another object of the invention is to so mount the tail-stock that that portion of the tool carriage not actually occupied by the tool may be run back underneath the tail-stock, which allows the tool to start its cut close to the tail-stock, thereby securing greater rigidity than in the common type of lathe, in which it is necessary to unduly extend the tail-spindle over a part of the carriage in order to reach the work, more especially if the work is short, which necessitates the tool being placed at the extreme side of the carriage farthest from the tail-stock in order to provide operating room for the carriage between the tail-stock and dog which drives the work. This feature is also convenient for such operations as filing, polishing and taking measurements, as the carriage may be run entirely out of the way without disturbing the tail-stock.

A further object of the invention is to provide a lathe in which the tool-carriage may be run past the tail-stock and off the bed without removing the tail-stock or changing its position and without the necessity of removing or loosening any of the other parts of the machine, thereby making it possible to entirely remove the tool-carriage from the machine in a few seconds and substitute for it other tool carriages or fixtures of different design which might be arranged and specially fitted up for the more economical production of the particular work to be done, a feature which is not possible in other lathes.

A still further object of the invention is to provide a main slide or tool-carriage body, with extensions adapted under all adjustments of the parts to cover over the ways upon which said carriage is mounted, the head-stock being so constructed that the carriage extension at that end may pass into or beneath the frame which supports the head-stock.

Another object of the invention is to provide a simple but highly efficient lathe at reduced cost, for manufacturing purposes, consisting of only such parts as are necessary for the proper operation of a machine for this class of work. This eliminates a great number of parts which are necessary and desirable in lathes for general purposes, and thereby greatly reduces the cost. This is accomplished to quite a large extent by doing away with the usual cone pulley on the spindle, the back gears, and the complicated change and reverse gears found in the ordinary lathes on the market. A great many manufacturing operations are often carried on continuously, thus requiring only one speed and feed, which does away with the necessity for the gears and cone pulley above referred to. If, however, it should be desired to run the spindle at other speeds, extra drive pulleys may be furnished, which are quickly interchangeable with the pulley herein shown, the difference in the length of belt required being taken care of by a compensating countershaft (not shown or described). By having only one gear on the spindle, instead of the usual cone pulley and back gears, and driving that by the right-angle shaft, as shown on the drawings, the necessary length of head-stock is greatly reduced, which, of course, reduces the length of the lathe.

Referring to the drawings, 1 denotes the bed of the lathe, which is box-like in structure and closed at the upper portion. It is supported in any suitable manner as, for instance, by legs or feet 2, adapted to rest upon a suitable stand or support, not shown. The spindle, denoted by 3, (see particularly Fig. 2), is mounted in bearings 4 secured to the head-stock or frame-work 5, which framework is adjustably mounted on flanges 6 formed as integral portions of the bed 1. Bolts 80, Fig. 1, pass up through slots formed in the flanges 6 and hold the frame-work in its adjusted position with reference to said flanges. The bed 1 (see Figs. 2, 7, 8 and 9) is slotted upon each side, and a key 81 is secured in each of said slots, the keys 81 fitting into similarly shaped grooves formed in the frame-work 5. This permits transverse or lateral movement of the frame-work with reference to the bed, and to bring about such lateral adjustment pins 82 are driven upwardly through holes formed in the flanges 6, projecting upwardly into recesses in the under face of the frame-work in line with set-screws 83 mounted in the sides of the frame-work, as is clearly shown in Fig. 7. It will thus be readily appreciated that by loosening the bolts 80 and manipulating the screws 83, the head-stock or frame-work 5 may be moved transversely of the bed. When the adjustment is effected the bolts 80 will, of course, be tightened up to hold the parts in their final adjusted position. This arrangement provides for a slight lateral adjustment of the head-stock, whereby the head-center and tail-center may be brought into perfect alinement for straight work or offset to provide for turning work on centers, which taper slightly.

In the form illustrated the spindle carries a draw-in chuck designated as a whole by 7, adapted to be manipulated by a clamp or worked through a hand-wheel 8. The end-thrust load of the spindle is taken by a shoulder 73, contacting with the ball thrust bearing which is designated as a whole by 74, said ball thrust bearing being supported at the rear by an adjustable collar 75, which is threaded into a wall 76 in the head-stock. Said collar is provided around its periphery with a series of holes spaced close enough together so that a pin or lever passed through a threaded opening 77 in the head-stock may be inserted in one of them and used as a lever to turn said collar and bring it to its proper adjusted position, said collar being held in its adjusted position by a set-screw or other clamping device, not shown. A threaded plug 78 is provided to close the opening in the head-stock.

The outer end of the spindle, as will be noted, is threaded, as at 9, and a large chuck face plate or other work driver may be employed. The spindle 3 has secured to it a worm-wheel 10, which meshes with a worm 11, secured to a shaft 12, driven through the agency of a pulley 13, see Fig. 3. When said pulley rotates in the direction as shown by the arrow, Fig. 3, the spindle 3 and worm wheel 10 are driven forward, as shown by the arrow, in a very powerful manner, through the shaft 12 and right-hand worm 11. Referring to Figs. 2 and 3, worm 11 is preferably made right-hand and rotates in the direction shown by the arrows, so that the side thrust or worm wheel 10 is toward the rear of the spindle, or in the same direction as the thrust of the tool when working.

Shaft 12 extends through the head-stock and at its outer end is provided with a pinion 14, which pinion in turn meshes with an idler or intermediate gear 15 and serves to impart motion to a large gear 16. Swiveled upon and adjustably secured to the outer end of a bushing or bearing member 17, which forms the support for the outer end of shaft 12, is an arm 18, provided with a slot 19 in which is adjustably mounted a stud 20, carrying a gear 21. The gear 15 is carried by a stud 22, adjustably mounted in a slot 23 formed in an arm 24, said arm being swiveled upon and adjustably secured to an outwardly-extending portion of a bearing 25 in which one end of a shaft 26 finds its bearing, the opposite end of said shaft being mounted in a bearing 27. Gear 16, as will be noted upon reference to Fig. 3, is secured to the outer end of the shaft 26 and when the parts are in the positions shown in Figs. 1 and 3 motion will be imparted to said shaft through shaft 12, pinion 14, gear 15, and gear 16, thereby causing said shaft 26 to rotate in the direction of the arrow in Fig. 1. Said shaft is employed, as will be hereinafter more fully set forth, to impart feeding motion to the tool-carriage. When it is desired to reverse the feed of the carriage, the gears will be brought into the positions shown diagrammatically in Fig. 6, the gear 21 being in position between the pinion 14 and larger gear 15. This may be effected by adjustment of the arms 18 and 24 and the adjustment of the gear 21 in the slot 19.

It will be readily understood by those skilled in the art that any rate of feed may be produced by merely changing the gears, which can be done in a very few moments upon removing the cover plate 28 and substituting the desired gears.

The shaft 26, as will be best seen upon reference to Figs. 2 and 3, has secured to it a worm 29, which meshes with a worm gear 30 loosely mounted upon a shaft 31, which extends lengthwise of the bed and is carried in suitable bearings, as best indicated in Fig. 2. Gear 30 carries one member 32 of a clutch, the opposite member 33 of said clutch being secured to a sliding member 34 splined to the shaft 31 and rotatable therewith. A yoke 35 coöperates with said sliding member, and secured to the shaft 36 which carries said yoke is a lever 37 which extends downwardly in the bed or frame, and has connected to its lower end a draw-rod or link 38. The opposite end of said link or draw rod is connected to the lower end of one arm of a bell-crank lever 39, fulcrumed upon a stud or bearing 40. A link 41 is connected to the opposite arm of said bell-crank lever, said arm being somewhat shorter than the downwardly-extending arm hereinbefore referred to.

Said link 41 is in turn connected at its upper end to a lever 42, the opposite end of said lever being secured to a short shaft 43, said shaft extending through the side wall of the bed and carrying at its outer end a lever 44, provided with an inverted V-shaped projection or cam member 45, and terminating in a finger-piece 44ª, which, through the connections above described, provides means for throwing the clutch in and out of engagement by hand.

The shaft 36 extends through the side wall of the bed and at its outer end carries the lever 79, which also provides means for throwing the clutch in and out of engagement by hand and at a convenient point remote from the carriage. This feature is very desirable when turning pieces where the chips removed are hot and would be very liable to burn the operator's hands when reaching down in front of the carriage, as in other lathes, to throw out the feed.

The tool-carriage, designated by 46, is provided on its under face and beneath that portion which projects beyond the bed (see Figs. 1 and 5) with a downwardly-extending longitudinal rib 47, said rib having a dove-tailed member formed thereon, to which is adjustably secured a trip block 48, said block being adapted to coöperate with the cam 45, and, through the connections above described, to throw the clutch out of operation and consequently to stop the rotation of the shaft 31 and the feed of the carriage. The release of the feed may be effected at any desired point in the travel of the carriage by adjusting the block 48 along the rib 47. It will, of course, be appreciated that the arrest of the feed movement of the carriage may be effected in one or the other direction, according to the position of the change gears hereinbefore described, the carriage being returned in the opposite direction by hand through the manipulation of a hand-wheel 49, which is secured to the outer end of a shaft 50, Fig. 1, the inner end of the shaft carrying a bevel gear 51, which meshes with a similar gear 52 secured to shaft 31. Said shaft 31 also carries a bevel pinion 53, which meshes with a corresponding gear 54, secured to the lower end of the drive shaft 55. Said shaft is mounted in suitable bearings carried by the depending post 56 extending downwardly from the lower face of the upper member of the bed. Said member is grooved out to form a dovetailed way into which fits the corresponding guide member 57 formed upon the lower face of the carriage 46. The carriage, as will be noted upon reference to Fig. 5, has an unusually broad bearing on the top of the bed, and the surfaces of both parts are carefully scraped to standard plates. Shaft 55 carries at its upper end a pinion 58 preferably formed as an integral portion of the shaft, the pinion meshing with a rack 59, secured to the carriage. An adjustable bearing plate or gib 60 will provide means for proper adjustment. As will be noted upon reference to Fig. 5, the shaft 55 is located centrally of the structure and the tool-carriage is thus driven centrally, whereby much of the cramp found in the ordinary type of lathe is eliminated.

The carriage 46, as will best be seen upon reference to Fig. 2, is provided at each end with a chip-guard, designated by 61, 62. These guards overlie the ways, and in fact substantially the entire upper face of the bed, and thus protect the ways and prevent injury thereto by the dropping of work or a tool thereon, and also prevent the entrance of chips into the ways which, of course, would interfere with the proper feed of the carriage. As will be seen, the guard 61 extends through an opening formed below the head-stock or framework 5, and the guards are of such length as to practically cover the ways when the carriage is moved to its limit in either one or the other direction. A plate 63 (see Figs. 2 and 3) will be secured to the under face of the head-stock 5, thus forming a chamber for lubricant, in which the worm wheel and worm 10 and 11 will run.

The tail-stock is of the form best shown in Figs. 4 and 5, and may be said to comprise a casting or member 64, having an inwardly-projecting and overhanging arm 65 in which the dead center 66 is adjustably mounted in the usual manner. The tail-stock will preferably be formed as an integral casting, as herein shown. It is mounted and movable upon dovetail ways 67, preferably formed as integral parts of the bed 1 upon one side thereof, the stock being secured in any desired adjustment along said ways by means of a clamping member 68 which is operated through the agency of a threaded sleeve 69, mounted in the tail-stock, as shown in Fig. 5. As will be seen upon reference to Fig. 5, the way 67 is formed as an integral portion of the bed, and that by reason of this fact and the particular clamping mechanism disclosed there is no tendency for the tail-stock to cant or get out of line, as it is locked in place. By having the lower end of the sleeve nut 69 bear upon that portion of the body of the tail-stock which is adjacent the upper portion of the way 67, and having the locking or clamping element 68 move upwardly against the lower face of the way, there is no tendency for the tail-stock to cant or turn and the way may be said to be put under compression, a point of manifest advantage over those constructions wherein the pressure is applied outwardly from the center of the guide-way, or where the clamping is effected directly upon one portion of the way, either of which tends toward a distortion of the parts and of their adjustment. By the employment of the overhanging tail-stock the carriage 46 may slide under the tail center 66, thereby making it unnecessary to have the tail-stock spindle extended when taking cuts near the dead center or for short work. This feature is also convenient for such operations as filing, polishing and taking measurements, as the carriage may be run entirely out of the way without disturbing the tail-stock.

From the foregoing it will at once be seen that the structure is compact and rigid, the parts are protected, and that by reason of having the tail-stock mounted upon the side of the bed various operations may be effected, as just pointed out, without changing the adjustment of the tail-stock.

Having thus described our invention, what we claim is:

1. In a lathe, the combination of a bed; a guide-way extending outwardly from one side thereof; a tail-stock mounted on said way, the upper end of said stock overhanging the bed; and means carried by said tail-stock, adapted to draw the tail-stock into compressive clamping relation with the way, whereby distortion of the parts is prevented and alinement of the tail-stock is maintained.

2. In a lathe, the combination of a bed; a guide-way extending outwardly from and along one side thereof and formed as an integral part of the bed; a tail-stock mounted on said way; a clamping member mounted in said tail-stock and engaging one side of said way; a stem extending from said clamping member; and a nut mounted on the opposite end of said stem and bearing on the stock at a point close to the adjacent portion of the way, whereby distortion of the parts is prevented and alinement of the tail-stock maintained.

3. In a lathe, the combination of a bed; a head-stock mounted thereon and spaced away from the upper face of the bed; ways on said bed; a tool-carriage mounted on the ways; a guard plate extending outwardly from each end of the carriage, said plates being co-extensive in width of the upper face of the bed and overlying said bed and ways; and a tail-stock.

4. In a lathe, the combination of a bed; an outwardly-extending flange located upon each side of the bed adjacent one end thereof; a head-stock secured upon said flanges and spaced away at its lower side from the body of the bed; ways in the upper portion of the bed; a tool-carriage mounted on said ways; ways upon one side of the bed; a tail-stock mounted upon said last-named ways and provided with an overhanging upper end; and a guard extending outwardly from each end of the carriage, said guards being substantially coextensive of the width of the bed, and covering said bed and the carriage ways.

5. In a lathe, the combination of a bed; a head-stock secured at one end thereof and spaced away from the upper face of the bed; a tool-carriage slidably mounted upon the upper face of the bed; a guard extending outwardly from each end of the carriage, said guards being coextensive in width of the upper face of the bed, and one of said guards extending in alinement with the opening formed between the bed and the head-stock; and a tail-stock.

6. In a lathe, the combination of a bed; a head-stock secured thereto; a tool-carriage bearing directly upon the upper face of the bed; ways for said carriage located centrally of said bed; a vertically-disposed shaft located within the bed; a rack secured to the under face of the carriage and housed thereby; a pinion carried by said shaft and meshing with said rack; and means for imparting motion to the shaft.

7. In a lathe, the combination of a bed; depressed ways formed centrally of said bed; a carriage mounted to slide upon said bed and ways; a vertically-disposed shaft located centrally of the bed; a pinion carried by the upper end of the shaft; a rack secured to the under face of the carriage and covered thereby, said rack meshing with said pinion; a power shaft for driving said vertically-disposed shaft; a clutch for said power shaft; and an adjustable trip secured to the carriage and adapted to release the clutch when the carriage has traversed a predetermined distance.

8. In a lathe, the combination of a bed; depressed ways formed centrally of said bed; a carriage mounted to slide upon said bed and ways; a vertically-disposed shaft located centrally of the bed; a pinion carried by the upper end of the shaft; a rack secured to the under face of the carriage, housed thereby, and meshing with said pinion; a power shaft for driving said vertically-disposed shaft; a clutch for said power shaft; an adjustable trip secured to the carriage and adapted to release the clutch when the carriage has traversed a predetermined distance; and manually-operated means mounted in the bed and coöperating with the power shaft for traversing the carriage in a direction opposite to that effected by the power drive.

9. In a lathe, the combination of a bed provided with laterally-extending side flanges; guides secured to the bed; a head-stock mounted on the bed and guides and shiftable transversely of the bed; bolts extending through slots formed in the flanges and into the head-stock for securing the same in place; pins extending upwardly from the bed; and set-screws mounted in the head-stock and bearing upon the pins.

10. In a lathe, the combination of a head-stock; a spindle mounted therein; a thrust-bearing for the spindle; and an adjustable collar for said bearing mounted in a fixed portion of said head-stock.

11. In a lathe, the combination of a head-stock; a spindle mounted in bearings therein; a thrust-bearing for said spindle; a wall through which the spindle extends; and an adjustable collar mounted in said wall and forming a stop for the thrust-bearing.

12. In a lathe, the combination of an inclosed head-stock; a transversely-extending wall therein; a spindle mounted in said head-stock and passing through the wall; a thrust-bearing for the spindle; and a collar adjustably mounted in the wall and taking against the thrust-bearing.

13. In a lathe, the combination of a bed having a flat top, and provided with a depressed guide-way; a tool-carriage mounted thereon, and having a full and direct bearing on the top of the bed throughout the full extent of the under face of the carriage; and a guide member extending downwardly from said carriage and coacting with the guide-way.

14. In a lathe, the combination of a bed having a finished top and likewise provided with a depressed guide-way; a tool-carriage the under face whereof is finished throughout its full length to make and provide a mechanical fit and bearing with said finished top; and a guide member extending downwardly from said carriage and coacting with the guide-way.

In testimony whereof we have signed our names to this specification in the presence of two subscribing witnesses.

GEORGE G. PORTER.
FRANK E. CABLE.

Witnesses:
JOHN C. BOLAND,
EDWARD K. McNEAL.